US009690336B2

(12) United States Patent
Sun

(10) Patent No.: US 9,690,336 B2
(45) Date of Patent: Jun. 27, 2017

(54) FUNCTION CARD FIXING STRUCTURE HAVING A RELEASING COMPONENT TO LOCK AND UNLOCK A SLIDING COMPONENT

(71) Applicants: LITE-ON ELECTRONICS (GUANGZHOU) LIMITED, Guangzhou (CN); LITE-ON TECHNOLOGY CORPORATION, Taipei (TW)

(72) Inventor: Wei-Chih Sun, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 104 days.

(21) Appl. No.: 14/920,173

(22) Filed: Oct. 22, 2015

(65) Prior Publication Data
US 2016/0327995 A1 Nov. 10, 2016

(30) Foreign Application Priority Data
May 6, 2015 (CN) .................. 2015 2 0289560 U

(51) Int. Cl.
*H01R 13/62* (2006.01)
*G06F 1/18* (2006.01)
*H01R 13/627* (2006.01)

(52) U.S. Cl.
CPC .............. *G06F 1/185* (2013.01); *G06F 1/186* (2013.01); *H01R 13/6275* (2013.01)

(58) Field of Classification Search
CPC .. H01R 113/62; H01R 13/625; H01R 13/627; H01R 13/6271; H01R 13/6275; H01R 13/629; H01R 12/7005; H01R 12/721; H01R 23/7005; H01R 23/7068; H01R 13/639; H05K 7/1405; H05K 7/1431; G06F 1/181; G06F 1/185; G06F 1/186
USPC ................. 439/325–328, 345, 352, 358; 361/679.32, 740, 801, 803, 825, 831
See application file for complete search history.

(56) References Cited

U.S. PATENT DOCUMENTS

| 6,174,189 B1 * | 1/2001 | Kuo ............... H05K 7/1405 439/327 |
| 6,881,089 B1 * | 4/2005 | Yang ............... H01R 12/7058 361/801 |
| 7,419,379 B2 * | 9/2008 | Wu ............... G06F 1/184 439/65 |

(Continued)

*Primary Examiner* — Chandrika Prasad
(74) *Attorney, Agent, or Firm* — Li & Cai Intellectual Property (USA) Office

(57) ABSTRACT

A function card fixing structure is provided, comprising a main body including a first portion and a second portion, wherein the first portion is perpendicular to the second portion, and the first portion comprises a plurality of trenches extending along a direction of a long axis of the main body. A sliding component is disposed at a side of the second portion, wherein the sliding component comprises a plate body and a locking portion, and one side of the plate body comprises a plurality of openings and stopping portions. A releasing component comprising a locking portion is at one side, wherein the locking portion of the releasing component is locked with the locking portion of the sliding component.

10 Claims, 13 Drawing Sheets

(56) References Cited

U.S. PATENT DOCUMENTS 7,637,748 B2 * 12/2009 Chung ............ H01R 13/62988
439/59
2004/0184252 A1 * 9/2004 Lin ........................ G06F 1/184
361/801

* cited by examiner

FUNCTION CARD FIXING STRUCTURE HAVING A RELEASING COMPONENT TO LOCK AND UNLOCK A SLIDING COMPONENT

BACKGROUND OF THE INVENTION

1. Field of the Invention

The instant disclosure relates to a fixing structure; in particular, to a function card fixing structure.

2. Description of Related Art

In the recent age of information and technology, computers are necessary for people in their daily life. In order to increase the functions of computers, slots of a mother board are required to install function cards, such as a sound card, graphic accelerating card, interface card or network card to increase the additional functions thereof. However, when transporting the computers or if the computers are impacted by accident, the function cards drop out of the mother board and the slots of the mother board are easily damaged. In order to prevent the looseness of the function card, a traditional way sets a metal blank connected to the function card, so that after the function card is plugged to the slot of the mother board, the metal blank is fixed to the computer casing to insure the function card not dropping off when transporting the computer or the computer being impacted in an accident, and that the function card is electrically connected to the mother board well. However, with the increasing functions of function cards and the mother board needing to be plugged with many function cards to increase the functions thereof, the functions easily generate heat. Therefore, the function card needs adding a heat dissipation module to help releasing heat. Accordingly, these function cards have bigger size and have more weight than standard expansion cards. The heat dissipation module not only increases the overall weight of the function card and mother board, but also makes the function card unable to be solidly fixed on the mother board with the design where only a side of the function card has a metal blank. This issue further affects the stability of the entire structure including the mother board and the function cards, and the electrical connection of the function cards to the mother board is also affected. Furthermore, the traditional structure using the metal blank or other structures requires a plurality of screws for installing function cards. It is extremely inconvenient for people engaged in the industry to assemble and disassemble the function cards.

SUMMARY OF THE INVENTION

The objective of the instant disclosure is to provide a function card fixing structure which can solve the drawbacks of traditional structure. In order to achieve the aforementioned objectives, according to an embodiment of the instant disclosure, a function card fixing structure is provided, comprising a main body including a first portion and a second portion, wherein the first portion is perpendicular to the second portion, and the first portion comprises a plurality of trenches extending along a direction of a long axis of the main body. A sliding component is disposed at a side of the second portion, wherein the sliding component comprises a plate body and a locking portion, and one side of the plate body comprises a plurality of openings and stopping portions. A releasing component comprising a locking portion is at one side, wherein the locking portion of the releasing component is locked with the locking portion of the sliding component.

Preferably, the casing has a plurality of bumping components plugged into the slots of the plate body of the sliding component to limit moving of the sliding component along a direction.

Preferably, the function card fixing structure further comprises at least one elastic component, and one side of the elastic component is fixed to the main body and another side of the elastic component is fixed to the sliding component, and when the slots of the sliding components are aligned to the trenches, the elastic component applies an elastic force to the sliding component.

Preferably, the openings and the stopping portions are alternatively interposed with each other, and the stopping portion of the sliding component are used to limit movement a plug portion of the function card when the plug portion is plugged into the corresponding trenches.

Preferably, the function card comprises at least one heat sink module, and another side of the function card opposite the plug portion is fixed to a casing.

The disclosure has advantages as follows. The releasing component of the function card fixing structure has a locking portion at an end, and this locking portion of the releasing component can lock with the locking portion of the sliding component. After the function card is plugged into the trench, a user can push the releasing component for the sliding component to cover the trench, so that the function card is fixed. According to the function card fixing structure, a user can proceed with a sliding action to the sliding component to install and disassemble the function card. The user does not need use any screw to install a function card and disassemble the function card. Therefore, the user can be bare-handed install and disassemble the function card. The action is easy and there is no issue of losing accessories. In addition, the function card fixing structure provided by the disclosure can provide the function card with enough fixing strength, such that the function card is not separated from the casing during transporting and is not damaged accordingly.

In addition, the function card fixing structure can be used for vertical type or horizontal type casing. That is, the disclosure does not limit where the function card fixing structure connects to the casing. The position where the function card fixing structure is located can change in accordance with shape, size or function of the casing, and the installation and disassembling of the function card fixing structure are not affected.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

The aforementioned illustrations and detailed descriptions are exemplary for the purpose of further explaining the scope of the instant disclosure. Other objectives and advantages related to the instant disclosure will be illustrated in the subsequent descriptions and appended drawings.

First Embodiment

Figure 1:
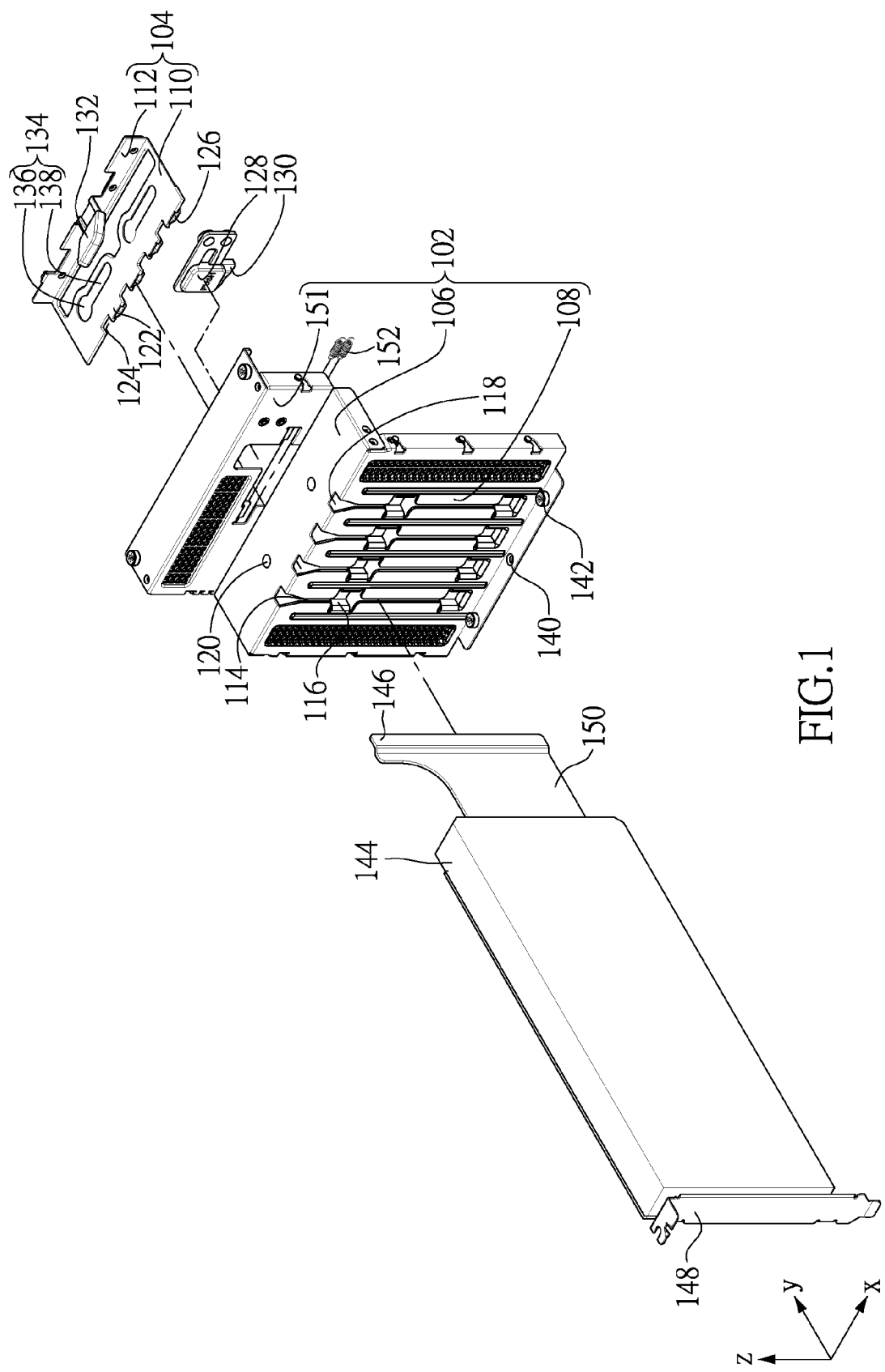
FIG. 1 shows an exploded view of a function card fixing structure of an embodiment of the disclosure.
Figure 2:
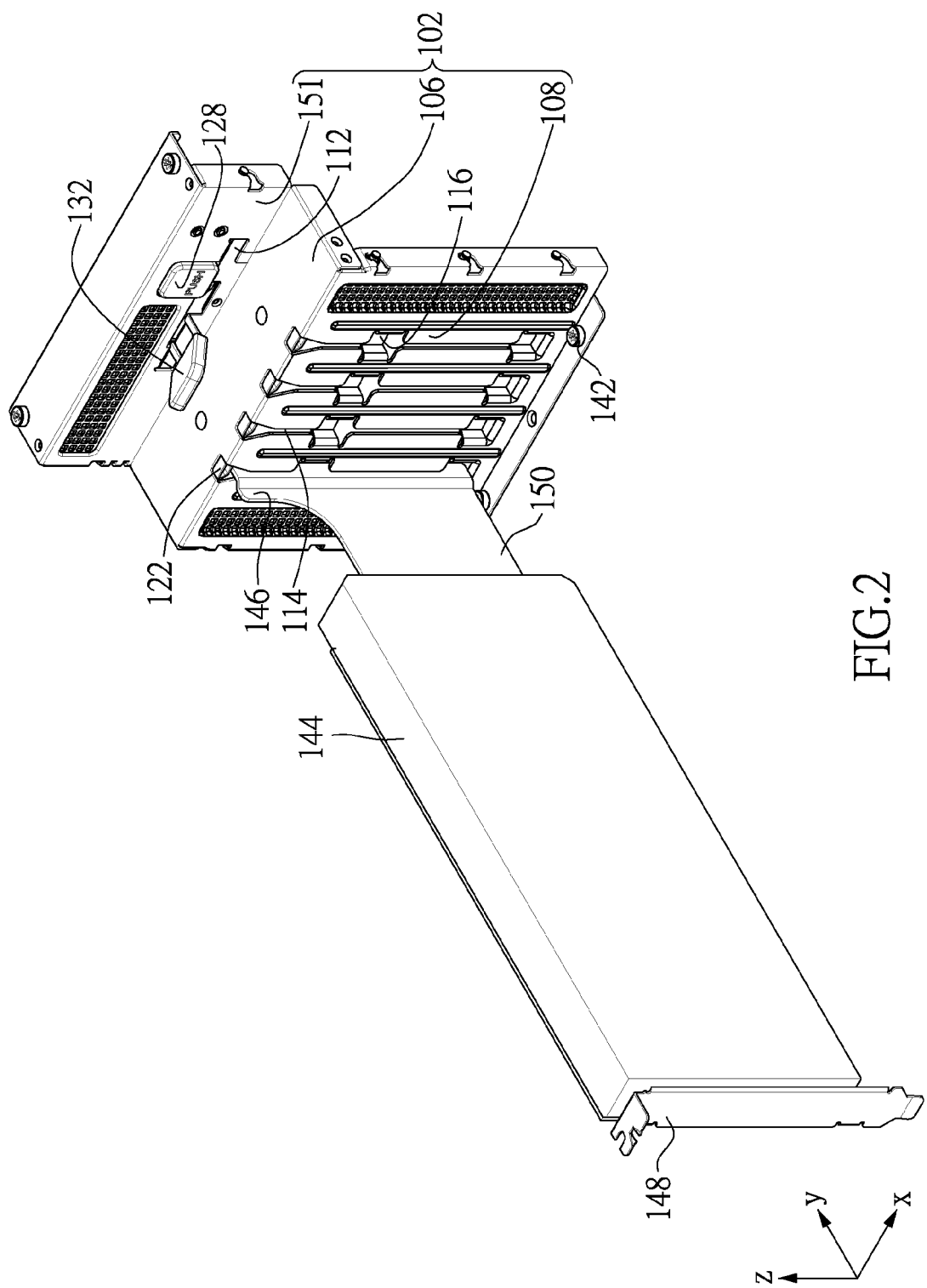
FIG. 2 shows a three dimensional view of a function card fixing structure of an embodiment of the disclosure.
Figure 3:
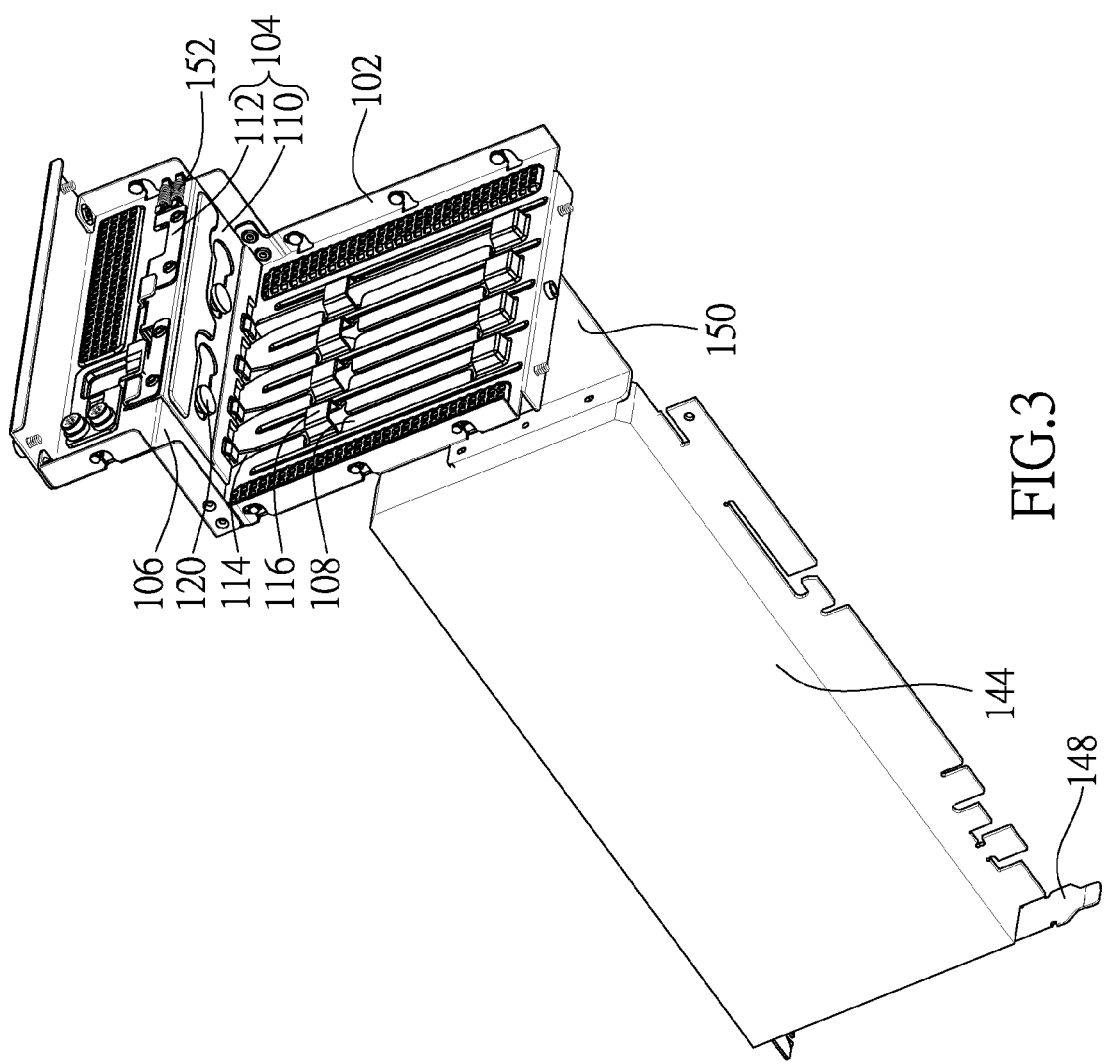
FIG. 3 shows a three dimensional view of a function card fixing structure of an embodiment of the disclosure at another view angle.
Figure 4:
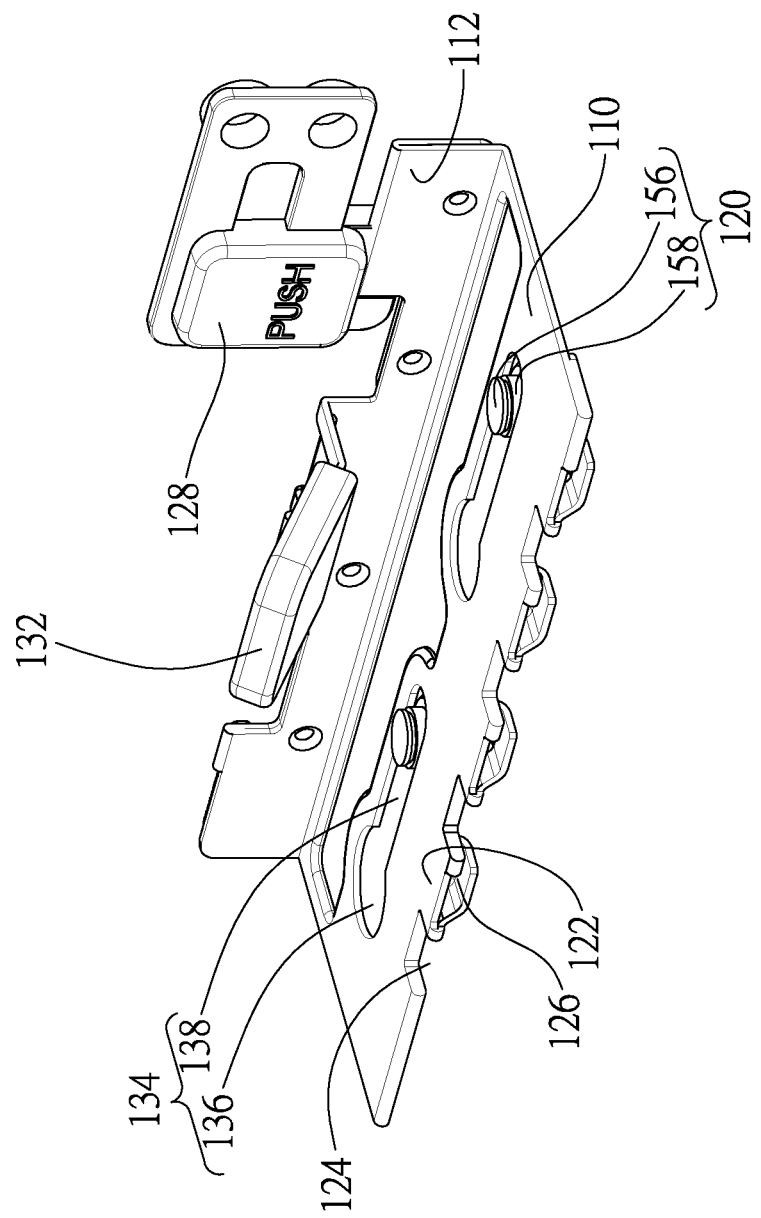
FIG. 4 shows a three dimensional view of a sliding component of an embodiment of the disclosure.
Figure 5A:
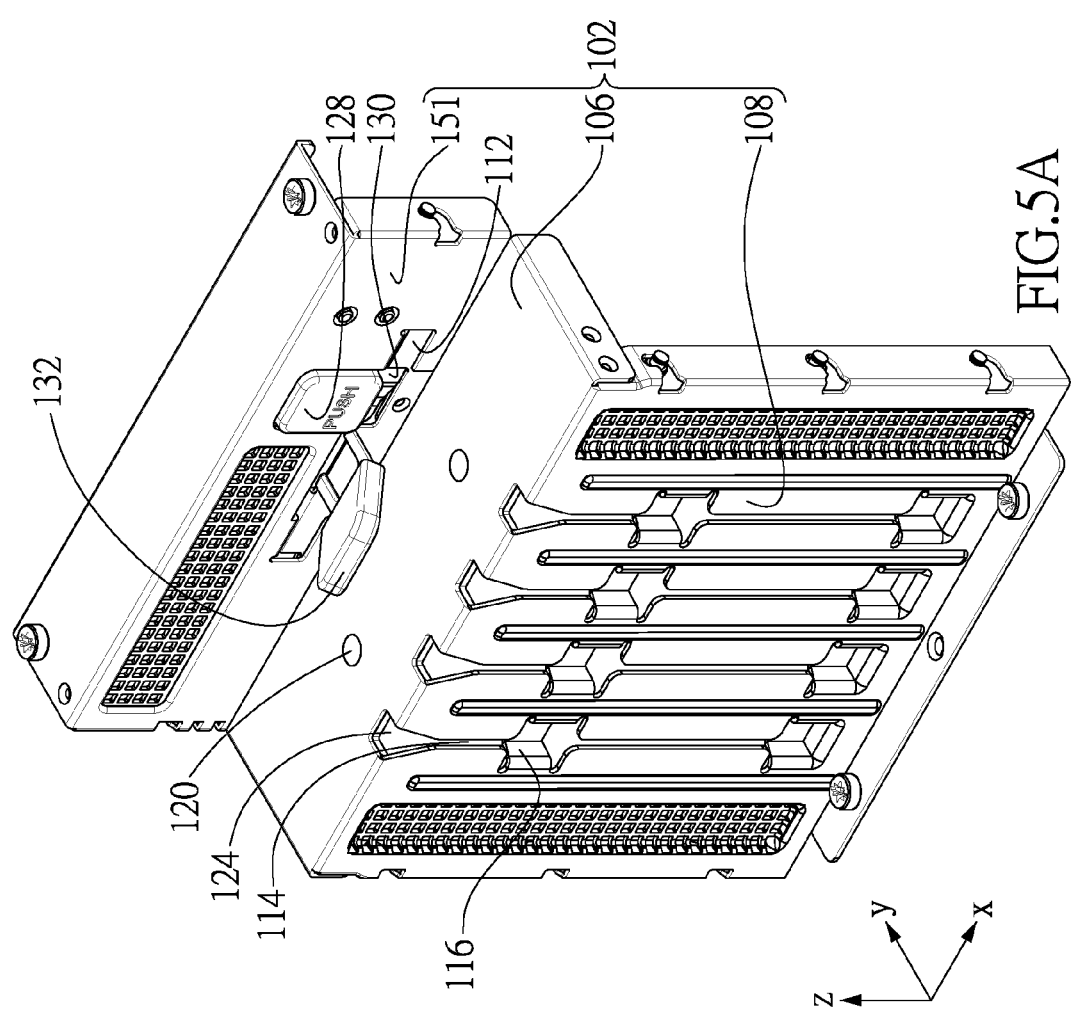
FIG. 5A shows a three dimensional view of a function card fixing structure of an embodiment of the disclosure.
Figure 5B:
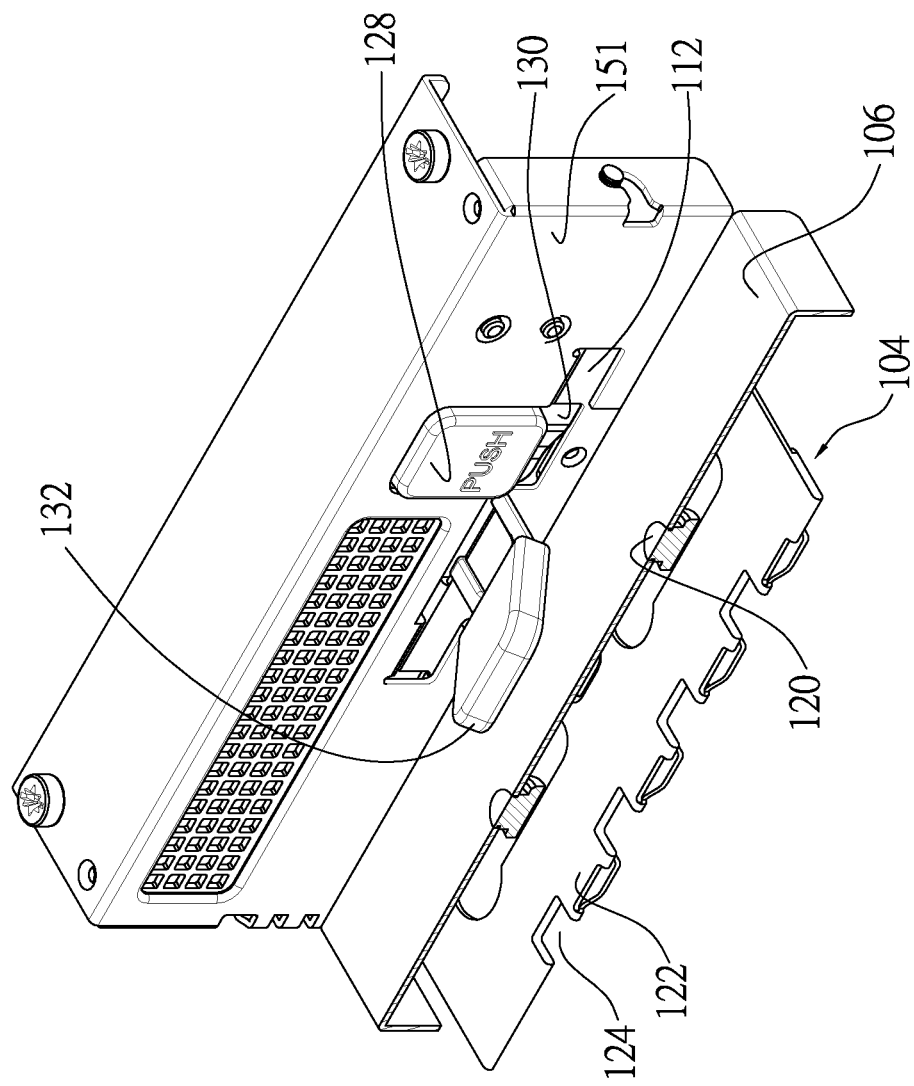
FIG. 5B shows a local three dimensional view of FIG. 5A in which the first portion of the function card fixing structure is removed.
Figure 5C:
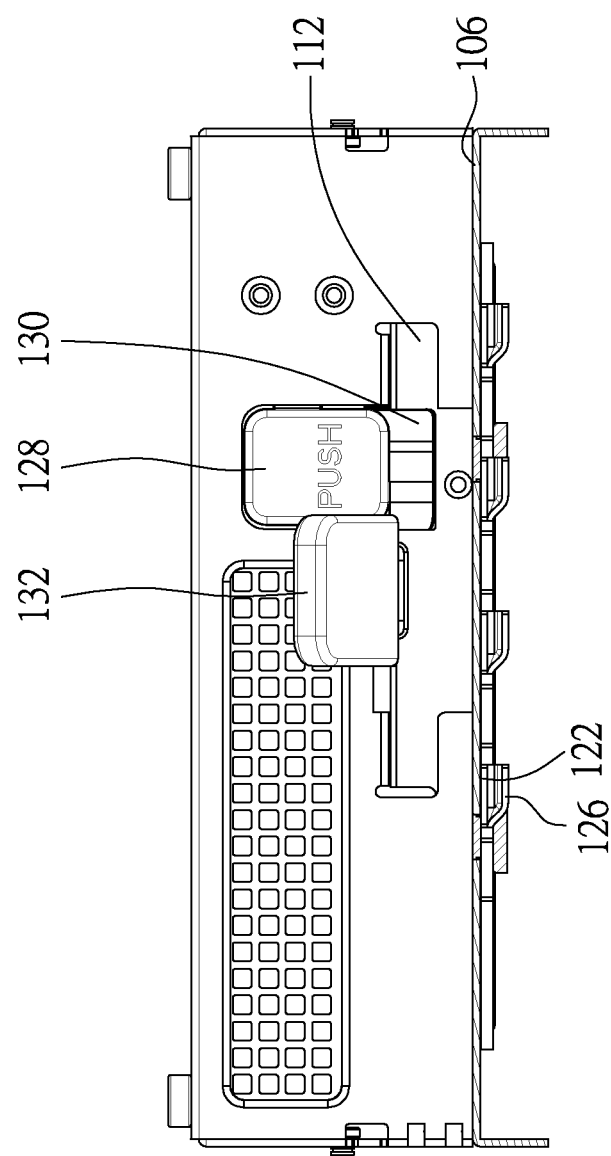
FIG. 5C shows a local cross section view of FIG. 5A in which the first portion of the function card fixing structure is removed.
Figure 5D:
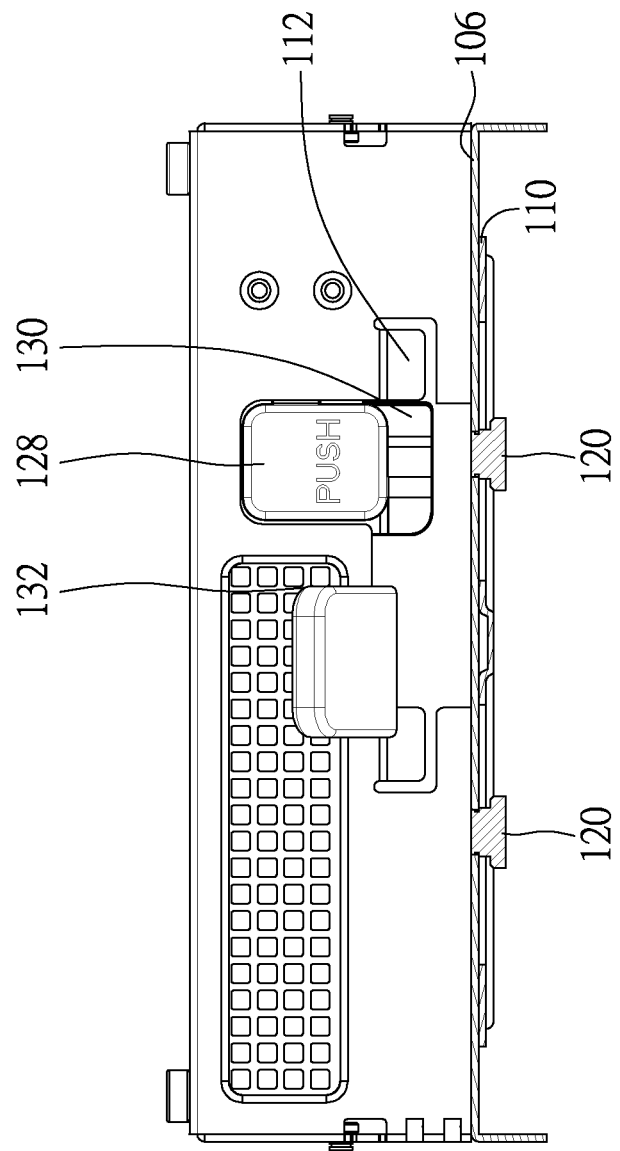
FIG. 5D shows another local cross section view of FIG. 5A.

Referring to FIG. 1, FIG. 2 and FIG. 3, the embodiment provides a function card fixing structure, comprising a main body 102 which has a first portion 108 and a second portion 106. The first portion 108 and the second portion 106 are perpendicular to form an L shaped structure. However, the disclosure does not limit the shape of the function card fixing structure. The shape of the function card fixing structure can vary in accordance with the shape and size of a casing. The first portion 108 of the main body 102 comprises a plurality of trenches 114 which extend along a direction of a long axis of the main body 102. In more detail, the trenches 120 are open having wide top portion and narrow middle portion. Therefore, a plug portion 146 of the function card 144 can be plugged into the trench 114, and the narrow portion of the trench 114 can limit horizontal movement, i.e. the x direction, of the function card 144. The first portion 108 of the main body 102 has a stop portion 116 neighboring each of the trenches 114. The stop portion 116 of the main body 102 can be anti-U shaped and is used to limit movement of the function card 144 along the direction parallel to one axis of the function card, i.e. the y direction. However, the disclosure does not limit the stop portion 116 to be anti-U shaped. The stop portion 116 can have another shape. The main body 102 can comprise a plurality of threaded holes 140 therein and can be fixed to a casing using a plurality of screws 142. The main body shown in FIG. 1 comprises four trenches 114, but this is only an example. The amount of the trenches can vary in accordance with size of the casing or spec of the product. Top portions of the trenches 114 extend to the second portion 106 of the main body 102 to form a plurality of openings 118 in the second portion 106 of the main body 102.

The function card fixing structure further comprises a sliding component 104, and as shown in FIG. 1, FIG. 2, FIG. 3 and FIG. 4. The sliding component 104 is movably disposed under the second portion 106 of the main body 102. The sliding component 104 comprises a plate body 110 and a locking portion 112, in which the plate body 110 and the locking portion 112 are perpendicular with each other. A side of the plate body 110 comprises a plurality of openings 124 and stopping portions 122, in which the openings 124 and stopping portions 122 are disposed alternatively. In more detail, two stop portions 122 are disposed at two sides of one of the openings 124, and the opening 124 and the stop portion 122 neighbor each other. The stop portions 122 substantially are flanges of the plate body 112, and further comprise arc shaped structures 126 thereunder. The arc shaped structure 126 comprises a bevel and a plane, in which the bevel is used for the plug portion 146 to be easily guided into the trenches 114 when moving the sliding component 104. The arc shaped structure 126 can have a function to suppress the plug portion 146. The stop portion 122 can be used to limit movement along the direction of the trench 114, i.e. in the z direction. The sliding component 104 can slide along the direction of the long axis of the second portion 106 of the main body 102, i.e. the x direction in FIG. 1, and a rod component 132 connects to the sliding component 104. Therefore, a user can move the sliding component 104 through pushing the rod component 132.

As shown in FIG. 3, the embodiment further comprises at least one elastic component 152, in which a side of the elastic component 152 is fixed to a side of the main body 102 and another side thereof is fixed to a side of the sliding component 104. The elastic component 152 can be a spring. When the user pushes the rod component 132 to move the sliding component 104 for the openings 124 of the sliding component 104 to align with the corresponding trenches 114, the elastic component 152 applies a force to the sliding component 104, in which the direction of the force is parallel to the plate body 110 and is along the direction toward the position of the elastic component 152. Two springs 152 are shown in the figures of the embodiment. However, the disclosure is not limited thereto. The amount of the springs 152 can vary in accordance with requirement of the product. The plate body 110 of the sliding component 104 can comprise a plurality of slots 134, each of which has a first opening 136 and a second opening 138, and the width of the first opening 136 is greater than the width of the second opening 138. The casing has a plurality of bumping components 120 plugged into the slots 134 of the plate body 110, and the bumping components 120 can be plugged into the first opening 136 first and then slide to the second opening 138, wherein each of the bumping components 120 comprises a first column-shaped structure 156 and a second column shaped structure 158. The first column-shaped structure 156 protrudes through a hole of the second portion 106 of the main body 102, so that the sliding component 104 is movably connected to the second portion 106 of the main body 102, and the sliding component 104 can only move along the long-axis direction thereof (i.e. the x direction).

In addition to the first portion 108 and the second portion 106, the main body 102 further comprises a third portion 151 perpendicular to the second portion 106, and a releasing component 128 is connected to the third portion 151 of the main body 102. The releasing component 128 comprises a locking portion 130. When the sliding component 104 is moved to a designated position, for example the openings 124 to which the plate body 110 aligns the trenches 114 of the main body 102, the locking portion 130 connected to the releasing component 128 is locked to the locking portion 112 of the sliding component 104. Therefore, the sliding component 104 is fixed by the locking between the locking portion 112 of the sliding component 104 and the locking portion 130 connected to the releasing component 128. The plug portion 146 of the function card 144 can pass through the opening 114 of the plate body 110 of the sliding component 104 to be plugged into the trench 114. The releasing component 128 can be pressed by the user to make the locking portion 112 of the sliding component 104 release from the locking portion 130 connected to the releasing component 128. The sliding component 104 returns to the original position, so that the stop portions 122 align to the trenches 114 through the force applied by the elastic component 152 to the sliding component 104. Accordingly, after the plug portion 146 is plugged into the corresponding trench 114 of the first portion 108, movement of the plug portion 146 of the function card 144 is limited.

The function card 144 can be an interface card, a graphic card, a network card, a sound card, etc in the embodiment, wherein a side of the function card 144 is fixed to a side of the casing including terminals, for example a front window, and the function card fixing structure can be fixed to the opposite side of the casing, for example a back window. The function card 144 is a heavy card in the embodiment, for example a card having a heat releasing module. Therefore, in addition to the fixing portion fixed to the side of the casing having terminals, another side of the function card is fixed to the opposite side of the casing (for example fixed to the function card fixing structure of the disclosure). Therefore, the function card 144 is not spaced apart from the casing during transport, and unwanted damage is prevented. In more detail, the function card fixing structure can fit function cards 144 which have various lengths. For example, the function card 144 can be full height or low profile. When the function card 144 is not long enough to have two sides fixed to opposite sides of the casing, a connection portion 150 can be added between the function card 144 and the plug portion 146. In addition, in an example, the function card 144 is a PCI interface card, and the function card fixing structure can be used for vertical type or horizontal type casing. It is noted that the disclosure does not limit the position where the function card fixing structure connects in the casing. The position where the function card fixing structure connects can change in accordance with shape, size or function of the casing.

Figure 6:
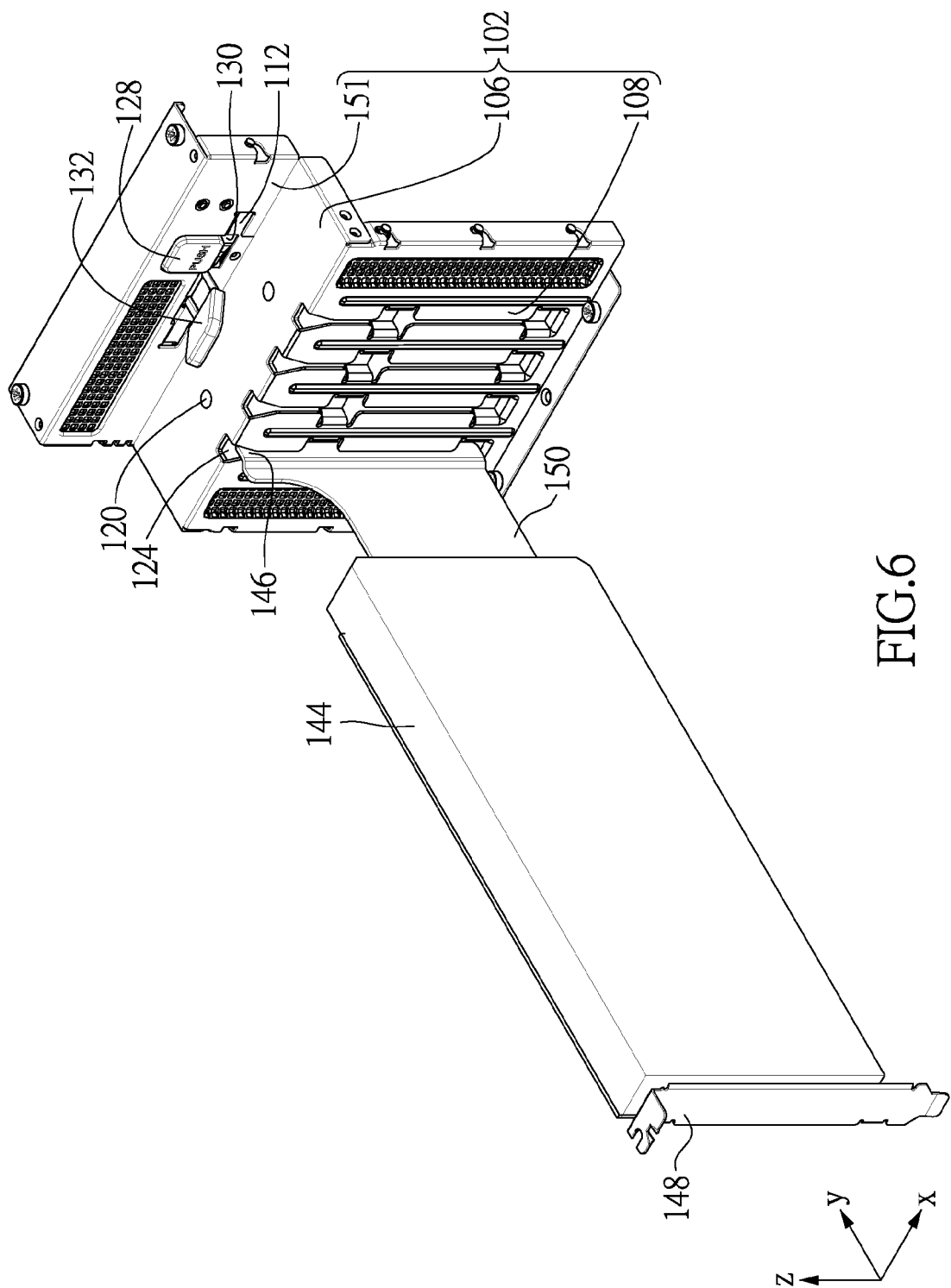
FIG. 6 shows a three dimensional view of a function card fixing structure of an embodiment of the disclosure.
Figure 7A:
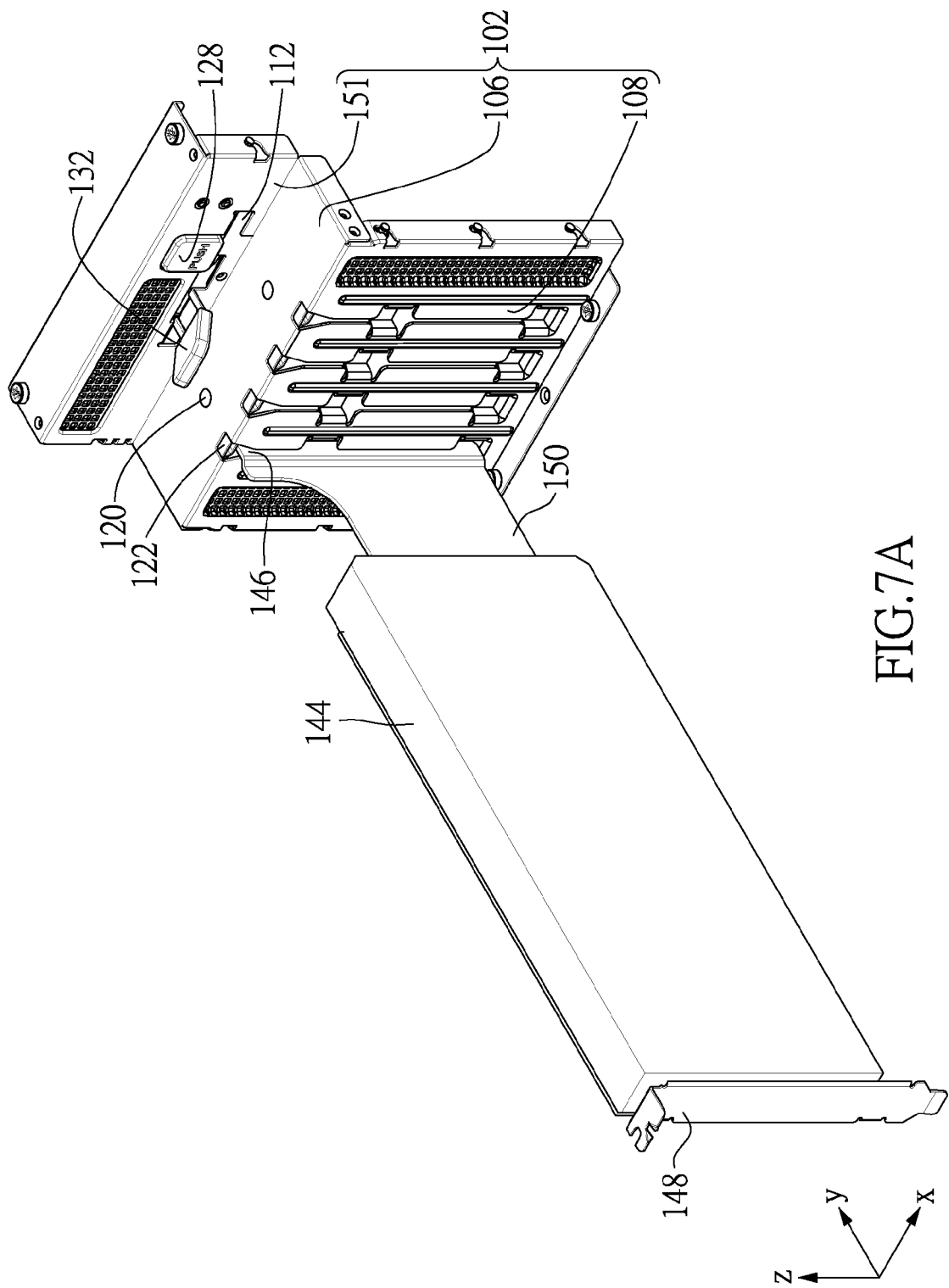
FIG. 7A shows a three dimensional view of a function card fixing structure of an embodiment of the disclosure.
Figure 7B:
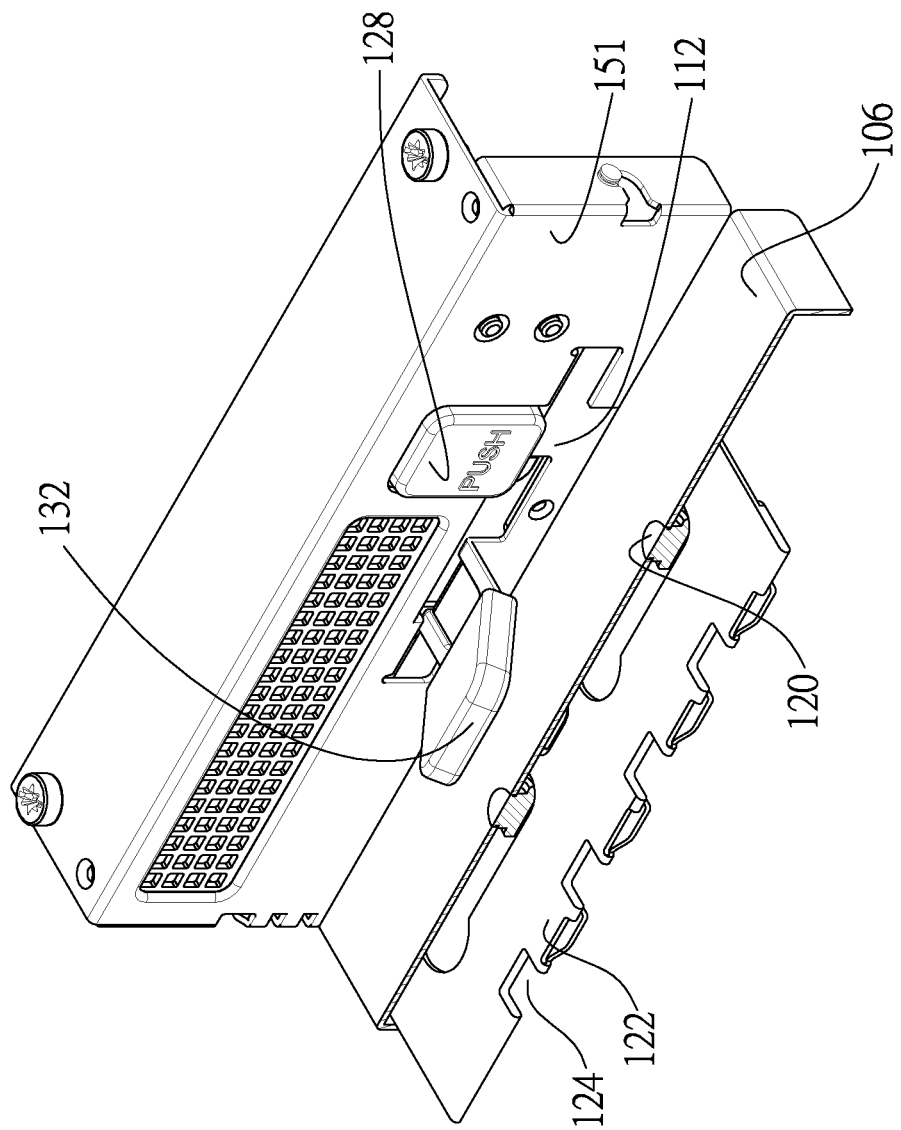
FIG. 7B shows a local cross section view of FIG. 7A.
Figure 7C:
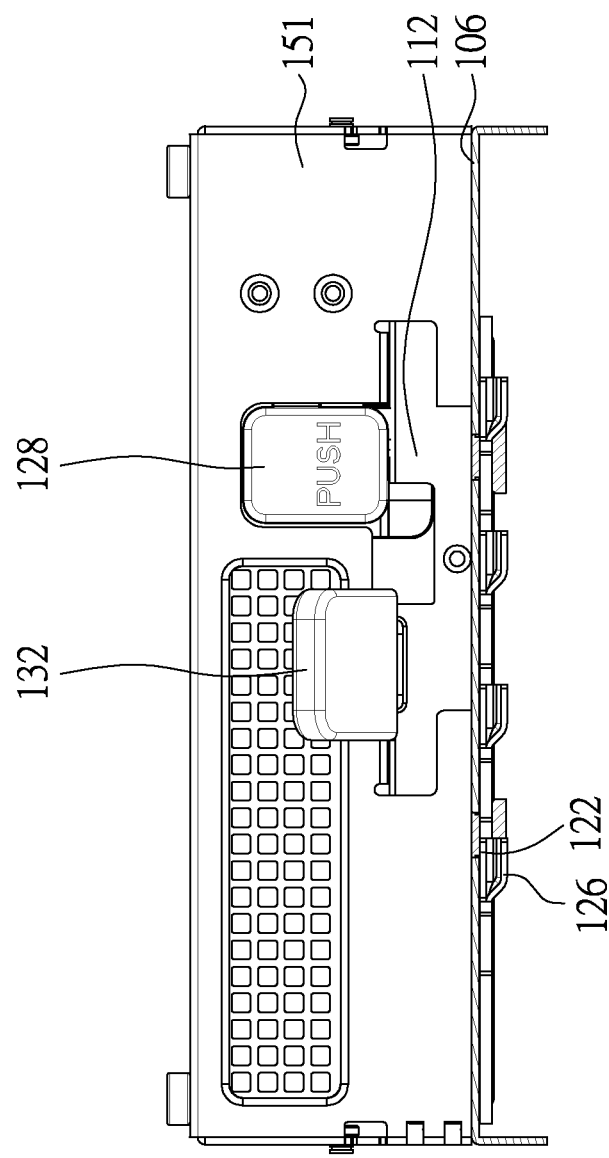
FIG. 7C shows a local cross section view of FIG. 7A.
Figure 8:
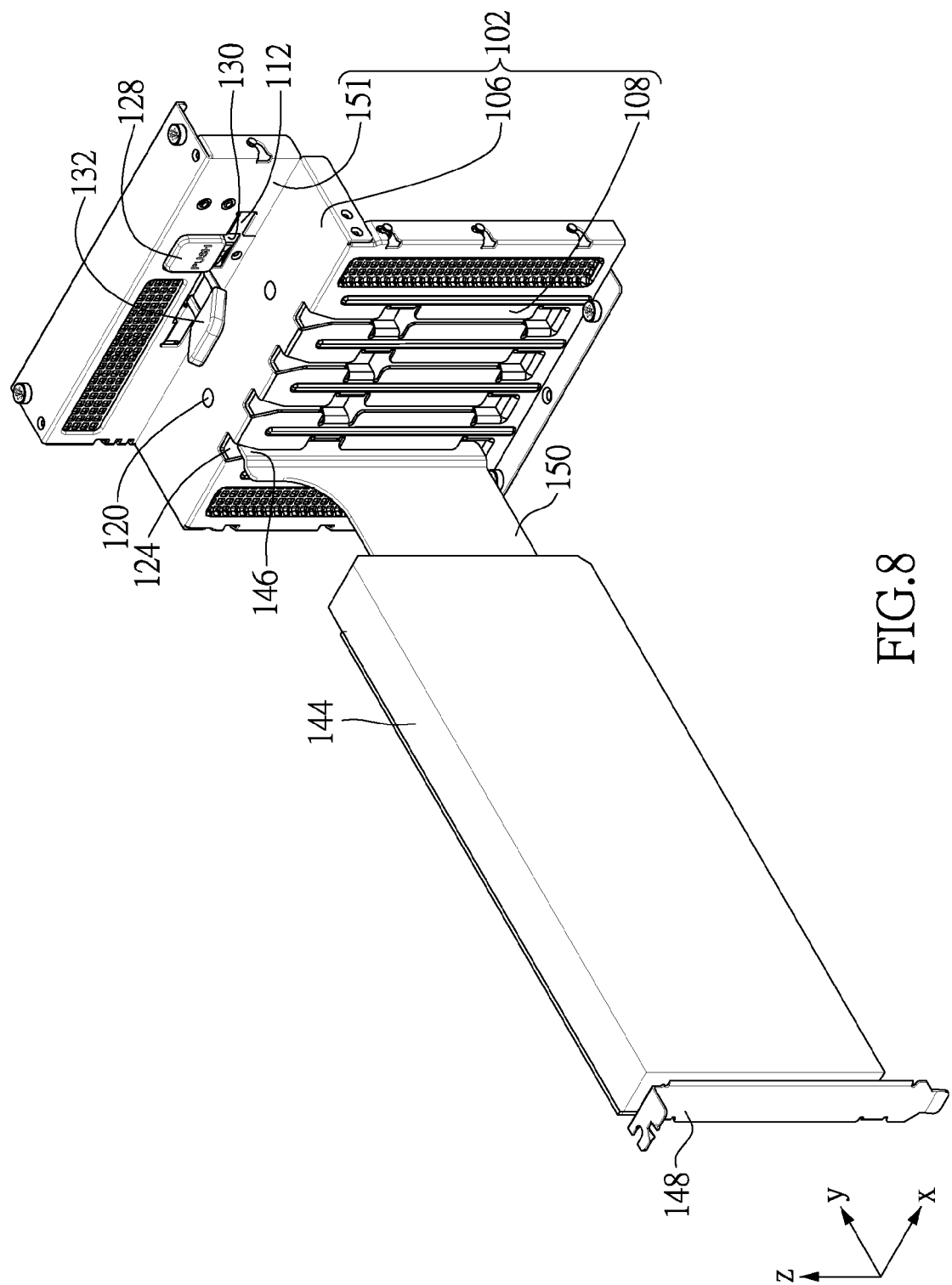
FIG. 8 shows a three dimensional view of a function card fixing structure of an embodiment of the disclosure.

The movement of the function card fixing structure of an embodiment of the invention is illustrated in accordance with FIG. 5A-FIG. 8. Please also refer to FIGS. 1 and 3 if the reference numbers of some elements are not shown in FIG. 5A-FIG. 8. First, please refer to FIG. 5A, FIG. 5B, FIG. 5C and FIG. 5D. Before plugging the plug portion 146 of a function card 144 into the trench 114 of the function card fixing structure, the rod component 132 is pushed to move the sliding component 104 connected to the rod component 132, such that the openings 124 of the sliding component 104 align to the trenches 114 of the main body 102. When the sliding component 104 reaches a position, the locking portion 112 thereof is locked to the locking portion 130 of the releasing component 128. Therefore, the sliding component 104 is fixed and cannot move. The elastic component 152 connected to the main body 102 and the sliding component 104 is strengthened to apply a force to the sliding component 104, in which the force is parallel to the plate body 110 and is along the direction away from the elastic component 152 to the position close to the elastic component 152. Next, as shown in FIG. 6, the plug portion 146 connected to the function card 144 is plugged into the trench 114 of the main body 102 passing through the opening 118 to the sliding component 104. At this moment, horizontal movement (along direction x) of the function card 144 is limited by the main body 102, and vertical movement (along direction y) of the function card 144 is limited by the stop portion 116. Referring to FIG. 7A, FIG. 7B and FIG. 7C, the releasing component 128 is pushed to separate the locking portion 112 of the sliding component 104 and the locking portion 130 of the releasing component 128. The sliding component 104 applied with the force from the elastic component 152 moves toward the elastic component 152 till the top portion of the trenches 114 are covered by the stop portions 122 of the sliding component 104. At this time, vertical movement (along direction z) of the function card 144 is limited by the top portion 116 of the sliding component 104. Therefore, the function card 144 cannot move along the vertical direction (the direction z). The sliding component 104 preferably is made of metal and is disposed under the second portion 106 of the main body 102. The sliding component 104 withstands the second portion 106 of the main body 102, so that the sliding component 104 can provide enough resist strength to the function card 144. On the contrary, referring to FIG. 8, if the user wants to take the function card 144 out, he can push the rod component 132 again to move the sliding component 104 connected to the rod component 132 till openings 124 of the sliding component 104 align to the trenches 114 of the main body 102. Accordingly, the user can move the plug portion 146 connected to the function card 144 out through the opening 124 of the sliding component 104 to take out the function card 144.

According to the description above, the disclosure has the features as follows. According to the function card fixing structure, a user does not need to use any screw to install a function card and disassemble the function card. Therefore, the user can be bare-handed to install and disassemble the function card. The action is easy and there is no issue of losing accessories. In addition, the function card fixing structure provided by the disclosure can provide the function card with enough fixing strength, such that the function is not separated from the casing during transporting and is not damaged accordingly.

The figures and descriptions supra set forth illustrate the preferred embodiments of the instant disclosure; however, the characteristics of the instant disclosure are by no means restricted thereto. All changes, alterations, combinations or modifications conveniently considered by those skilled in the art are deemed to be encompassed within the scope of the instant disclosure delineated by the following claims.

What is claimed is:

1. A function card fixing structure, comprising:
    a main body comprising a first portion and a second portion, wherein the first portion is perpendicular to the second portion, the first portion comprises a plurality of trenches extending along a direction of a long axis of the first portion;
    a sliding component disposed at a side of the second portion, wherein the sliding component comprises a plate body and a locking portion, and a side of the plate body comprises a plurality of openings and stopping portions; and
    a releasing component comprising a locking portion at a side, wherein the locking portion of the releasing component is locked with the locking portion of the sliding component.

2. The function card fixing structure as recited in claim 1, wherein the function card fixing structure is fixed at a side of a casing.

3. The function card fixing structure as recited in claim 2, wherein the plate body of the sliding component comprises a plurality of slots.

4. The function card fixing structure as recited in claim 3, wherein each of the slots has a first opening and a second opening, and a width of the first opening is greater than a width of the second opening.

5. The function card fixing structure as recited in claim 4, wherein the casing has a plurality of bumping components plugged into the slots of the plate body of the sliding component to limit moving of the sliding component along a direction.

6. The function card fixing structure as recited in claim 1, further comprising at least one elastic component, and one side of the elastic component is fixed to the main body and another side of the elastic component is fixed to the sliding component, and when the slots of the sliding components are aligned to the trenches of the trenches, the elastic component applies an elastic force to the sliding component.

7. The function card fixing structure as recited in claim 1, wherein the openings and the stopping portions are alternatively interposed with each other, and the stopping portion of the sliding component is used to limit movement of a plug portion of the function card when the plug portion is plugged into the corresponding trenches.

8. The function card fixing structure as recited in claim 7, wherein the function card comprises at least one heat sink module, and another side of the function card opposite the plug portion is fixed to a casing.

9. The function card fixing structure as recited in claim 1, further comprising a rod component fixed to the sliding component.

10. The function card fixing structure as recited in claim 1, wherein each of the stopping portions further comprises an arc structure disposed at one side.

* * * * *